(12) United States Patent
Kumar et al.

(10) Patent No.: US 6,813,583 B2
(45) Date of Patent: Nov. 2, 2004

(54) WHEELSPEED ESTIMATION SYSTEM AND METHOD

(75) Inventors: Ajith Kuttannair Kumar, Erie, PA (US); Samuel Lyle Hazen, Mayville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/326,342

(22) Filed: Dec. 20, 2002

(65) Prior Publication Data

US 2004/0122616 A1 Jun. 24, 2004

(51) Int. Cl.[7] .............................................. G06F 19/00
(52) U.S. Cl. ......................... 702/148; 701/19; 701/81
(58) Field of Search .................... 702/148; 340/441, 340/671; 318/52, 71, 490, 782; 701/19, 20, 22, 81; 361/31, 57, 87

(56) References Cited

U.S. PATENT DOCUMENTS

| | | | |
|---|---|---|---|
| 3,952,236 A | 4/1976 | Hoover | |
| 4,161,717 A * | 7/1979 | Hoover et al. | ............... 340/441 |
| 4,279,395 A | 7/1981 | Boggio et al. | |
| 4,347,569 A | 8/1982 | Allen, Jr. et al. | |
| 4,588,932 A | 5/1986 | Riondel | |
| 4,896,090 A * | 1/1990 | Balch et al. | ................... 318/52 |
| 4,945,753 A | 8/1990 | Twombly | |
| 5,187,420 A * | 2/1993 | Kajitani et al. | ............. 318/823 |
| 5,424,948 A | 6/1995 | Jordan, Jr. | |
| 5,436,538 A | 7/1995 | Garvey et al. | |
| 5,458,405 A | 10/1995 | Watanabe | |
| 5,610,819 A * | 3/1997 | Mann et al. | ................... 701/20 |
| 5,629,567 A | 5/1997 | Kumar | |
| 5,748,503 A | 5/1998 | Saeki et al. | |
| 5,990,648 A | 11/1999 | Kumar et al. | |
| 5,992,950 A | 11/1999 | Kumar et al. | |
| 6,104,148 A | 8/2000 | Kumar et al. | |
| 6,148,269 A | 11/2000 | Kumar et al. | |
| 6,152,546 A * | 11/2000 | Daigle | ........................ 303/151 |
| 6,194,850 B1 | 2/2001 | Kumar et al. | |
| 6,208,097 B1 * | 3/2001 | Reddy et al. | ................. 318/52 |
| 6,359,346 B1 | 3/2002 | Kumar | |
| 6,532,405 B1 * | 3/2003 | Kumar et al. | ................. 701/19 |
| 2001/0035049 A1 | 11/2001 | Balch et al. | |

\* cited by examiner

*Primary Examiner*—Kamini Shah
(74) *Attorney, Agent, or Firm*—Senniger, Powers, Leavitt & Roedel; Carl Rowold (57) ABSTRACT

A system and method for estimating the wheel speed of a vehicle propelled by DC motors mechanically coupled to at least one wheel on the vehicle so as to rotate said one or more wheel. At least one current detector is configured to measure armature and field current in each of the DC motors and produce a signal proportional to said currents and a voltage detector is configured to measure voltage applied to each of the DC motors and produce a signal proportional to said voltage. A processor is configured to determine a rotational speed as a function of the measured currents and voltages and configured to apply a correction factor to the determined rotational speed to obtain a corrected rotational speed.

26 Claims, 8 Drawing Sheets

WHEELSPEED ESTIMATION SYSTEM AND METHOD

BACKGROUND OF THE INVENTION

1. Field of the Invention

The invention relates generally to measuring systems on traction vehicles, such as locomotives or transit vehicles, and more particularly, the invention relates to systems and methods for estimating the speed of the vehicle's wheels without using speed sensors.

2. Brief Description of the Prior Art

Locomotives and transit vehicles as well as other large traction vehicles are commonly powered by electric traction motors coupled in driving relationship to one or more axles of the vehicle. Locomotives and transit vehicles generally have at least four axle-wheel sets per vehicle, with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Alternatively, in an electrical braking mode of operation, the motors serve as axle-driven electrical generators such that torque is applied to their shafts by their respectively associated axle-wheel sets, which then exert braking effort on the surface, thereby retarding or slowing the vehicle's progress. The motor generated energy can be dispersed in a grid of resistors.

The need to measure the rotational speed of the axle-wheel sets has been recognized in the art. In some locomotives, the locomotive speed or tangential wheel speed is calculated from measured motor rotor revolutions per minute ("RPM") values given the diameter of the associated wheel. Conventionally, a speed sensor or revolution counter is coupled to sense the rotational speed of an output shaft of each drive motor. These RPM signals are converted to wheel rotational speed from the known gear ratio of the mechanical coupling between the motor shaft and wheel axle. Wheel rotational speed is converted to vehicle linear speed based upon the assumed diameter of each driven wheel. Additionally, the speed sensor data may be used to detect a locked axle condition. If a locked axle condition occurs on a given axle while the locomotive is moving, the rotational speed of that axle decreases to zero, and all other axles rotate at a speed corresponding to the speed of the locomotive. Thus, a locked axle condition can be detected whenever a substantial difference in speed is sensed in one axle relative to the other axles.

However, some locomotives are not equipped with speed sensors capable of measuring the revolutional speed of the output shaft of the drive motors. Additionally, speed sensors operate in a treacherous environment and have a high failure rate. Accordingly, it would be advantageous to provide a wheel speed estimation system that does not require a speed sensor to be mounted on the output shaft of each drive motor capable of determining the vehicle's linear speed and capable of identifying a locked axle condition.

BRIEF DESCRIPTION OF THE INVENTION

In one embodiment, the invention is a method of estimating the wheel speed of a vehicle propelled by DC motors mechanically coupled to at least one wheel on the vehicle so as to rotate said one or more wheel. The method includes measuring the armature current and the field current in each of the DC motors and measuring a voltage applied to each of the DC motors. The method further includes determining a rotational speed as a function of the measured currents and voltage, and applying a correction factor to the determined rotational speed to obtain a corrected rotational speed. In one embodiment, the method further includes converting the corrected rotational speed into a linear wheel speed.

In another embodiment, the invention is a system for estimating the wheel speed of a vehicle propelled by DC motors mechanically coupled to at least one wheel on the vehicle so as to rotate said one or more wheel. The system includes at least one current detector configured to measure armature and field current in each of the DC motors and produce a signal proportional to said currents and a voltage detector configured to measure voltage applied to each of the DC motors and produce a signal proportional to said voltage. The system further includes a processor configured to determine a rotational speed as a function of the measured currents and voltages and configured to apply a correction factor to the determined rotational speed to obtain a corrected rotational speed. In one embodiment, the processor includes a motoring speed estimator module configured to determine a rotational speed using the current and voltage signals when the vehicle is operating in a motoring mode and produce a motoring rotational speed signal proportional to said rotational speed. The processor further includes a braking speed estimator module configured to determine a rotational speed using the current and voltage signals when the vehicle is operating in a braking mode and produce a braking rotational speed signal proportional to said rotational speed. The processor further includes a speed correction module configured to receive said motoring and braking rotational speed signals and at least one reference signal, said speed correction module configured to apply a correction factor to said rotational speed signals and translate said rotational speed signals to linear speed signals.

In another embodiment, the invention is a method of detecting the occurrence of a locked axle condition in a vehicle propelled by multiple DC traction motors. The method includes measuring armature currents for each of a plurality of DC traction motors connected to a plurality of axles. The method further includes determining a minimum armature current from the measured currents, determining a maximum armature current from the measured currents, and comparing the minimum armature current to the maximum armature current to identify the occurrence of a locked axle condition. In one embodiment, the method further includes determining if the locomotive is operating in a motoring mode or a braking mode, and adding a value to the minimum armature current proportional to an Emf value for the traction motor multiplied by the rotational speed of the traction motor and divided by a resistance value for the traction motor when the vehicle is operating in the motoring mode. In one embodiment the method further includes estimating the rotational speed of the traction motor by measuring the armature current and the field current in a DC motor, said DC motor being mechanically coupled to at least one wheel on the vehicle so as to rotate said one or more wheel, measuring a voltage applied to the DC motor, and determining a rotational speed from the measured currents and voltage.

DETAILED DESCRIPTION

The invention may be utilized in various types of series wound, direct current (DC) motor powered vehicles such as, for example, transit cars and locomotives. For purpose of illustration, the invention is described herein as it may be applied to a locomotive. In one example, a DC locomotive system 10 of FIG. 1 includes a variable speed prime mover 11 mechanically coupled to a dynamo electric machine 12 comprising a 3-phase alternating current (AC) synchronous generator or alternator. The 3-phase voltages developed by alternator 12 are applied to a conventional power rectifier bridge 13. The DC output of bridge 13 is electrically coupled to each of a plurality of DC traction motors 14A through 14F. The prime mover 11, alternator 12 and rectifier bridge 13 are mounted on the locomotive system 10, such as a six-axle diesel-electric locomotive. The locomotive system 10 is supported on multiple trucks 20, each truck 20 having two axle-wheel sets 22. Each of the traction motors 14 is hung on a separate axle-wheel set 22 and is mechanically coupled, via conventional gearing (not shown), in a driving relationship to the associated axle-wheel set 22.

Figure 1:
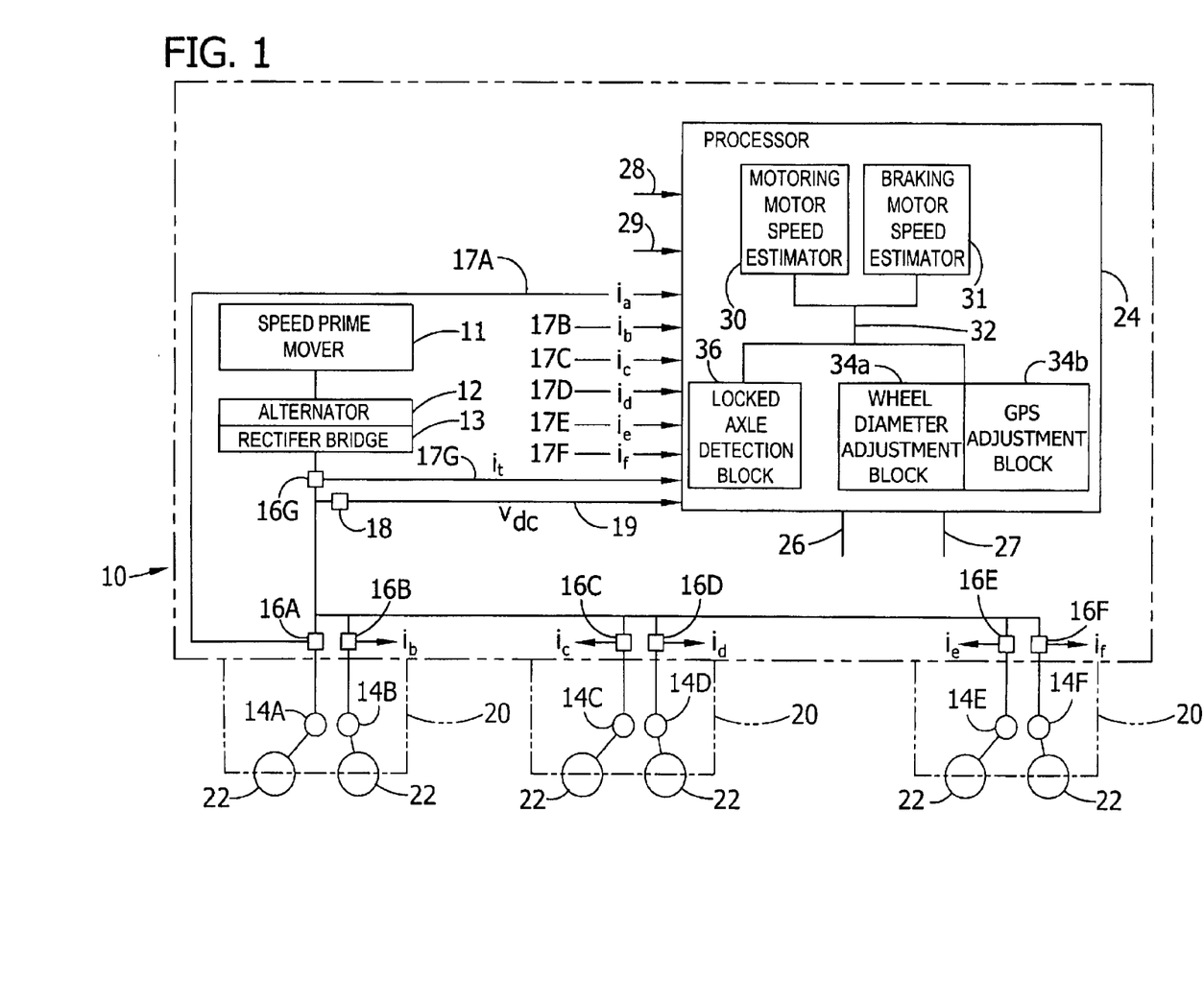
FIG. 1 shows a simplified block diagram of locomotive system having a processor such as may be used for executing the invention.

Suitable current sensors 16A through 16G and a voltage sensor 18 are used to provide a plurality of current signals 17A through 17G and a voltage signal 19 representative of the magnitudes of current and voltage in the motors 14. A processor 24 receives the current signals 17A–F, the traction motor field current signal 17G and the voltage signal 19 representing the traction motors armature currents, the traction motors field currents and the alternator voltage as will be described below. The processor 24 also may receive an input signal 26 representative of the locomotive speed, such as from a GPS detector, and a wheel diameter reference signal 27 as will be described below. The processor 24 further receives signals 28, 29 representative of whether the locomotive system 10 is operating in a motoring mode or a braking mode of operation, respectively. If the locomotive system 10 is operating in the motoring mode as indicated by motoring mode signal 28, the processor 24 activates a motoring motor speed estimator 30. If the locomotive system is operating in the braking mode as indicated by braking mode signal 29, the processor 24 activates a braking motor speed estimator 31. The activated estimator 30 or 31 supplies a signal 32 representative of the estimated rotational motor speed for use by the locomotive system 10. The processor 24 further contains a wheel diameter adjustment block 34A, a GPS adjustment block 34B, and a locked axle detection block 36 which will be fully discussed below.

Thus, the above provides a method for estimating the wheel speeds of the locomotive wheels 22 without using speed sensors and using signals from the onboard current detectors 16A–G and voltage detector 18 when the locomotive 10 is operating in either the motoring or electrical braking mode. Preferably, the locomotive system 10 estimates the wheel speeds using software in the processor 24, although a hardware implementation or a combined implementation is contemplated. The estimated wheel speeds are used for various purposes, including determining the linear speed of the locomotive system 10 and for locked axle detection. In one embodiment, after motor speed estimates are calculated in revolutions per minute (rpm), variations in wheel diameters are accounted for using the motor speed reference signal 32 and the wheel speeds are converted to linear speeds in miles per hour or kilometers per hour as desired. Although this method does not use speed sensors, it is contemplated that the method may also be used in conjunction with speed sensors.

Figure 2:
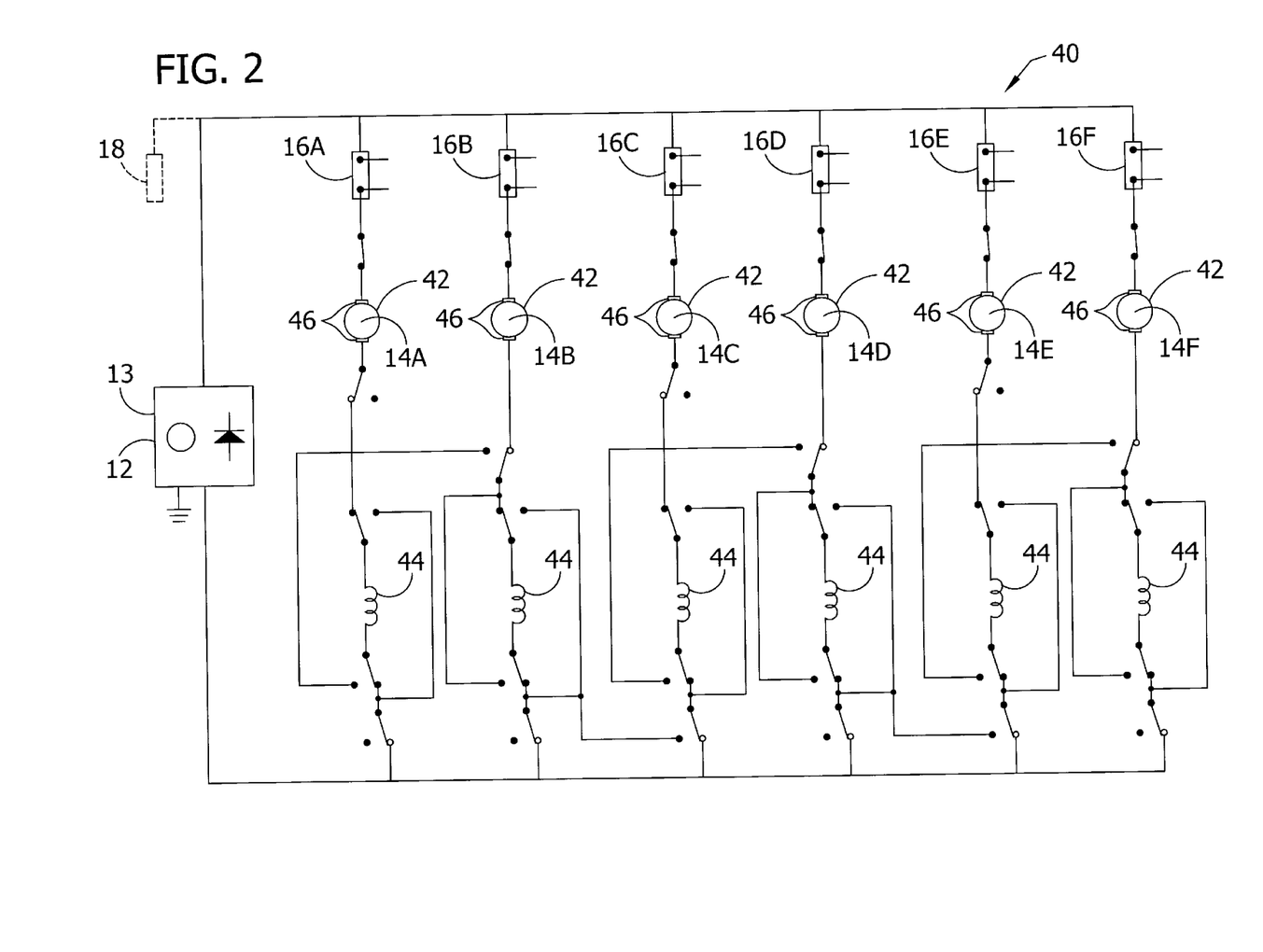
FIG. 2 is a schematic diagram showing the equivalent circuit for the locomotive system of FIG. 1 operating in a motoring mode.

FIG. 2 is a simplified schematic of an equivalent circuit 40 for the DC locomotive system 10 operating in a motoring mode. As shown, the six DC traction motors 14A–F (hereinafter referred to collectively as motor 14) are arranged in parallel across the alternator 12 and rectifier 13. As known in the art, each DC traction motor 14 comprises a rotating armature 42 and a fixed field 44. Preferably, the armature 42 and the field 44 for each traction motor 14 are connected in series, thus, the motors are referred to as "series wound" DC motors. The fixed fields 44 comprise tightly wound coils of wire fitted inside a motor case (not shown). The armature 42 comprises another set of coils wound around a central shaft (not shown). Brushes 46 electrically connect the rotating armature 42 to the field 44. When a current is passed through the motor circuit 40, there is a magnetic coupling between the current in the field 44 and the current in the armature 42, which causes the armature 42 to rotate. The current sensors 16A–F measure the current in the armatures 42 and fields 44 in each respective traction motor 14. Voltage sensor 18 measures the voltage generated by the alternator 12 and applied to the motors 14.

As one skilled in the art will understand, the field voltage "$V_f$" and the armature voltage "$V_a$" for a DC motor can be calculated using equations (1) and (2)

$$V_f = (R_f)i_f + (L_f)di_f/dt \tag{1}$$

$$V_a = (R_a)i_a + (L_a)di_a/dt + Eprpm*\omega \tag{2}$$

For the series connected traction motor 14A in the motoring condition, the field current "$i_f$" and the armature current "$i_a$" are the same and can be represented by current "i". (Fore ease of explanation, the described example uses traction motor 14A. Similar calculations may be performed for traction motors 14B–F as well.) Additionally, the sum of $V_f$ and $V_a$ are equal to the alternator voltage "$V_{dc}$". The motor exhibits armature resistance of magnitude "$R_a$" and field resistance of magnitude "$R_f$". The motor also exhibits an armature inductance of magnitude "$L_a$" and a field inductance of magnitude "$L_f$". As current passes through the armature, it produces a voltage of magnitude Ldi/dt, with the quantity di/dt indicating that this voltage is present only during changes in current. The value of Eprpm is the Emf for the motor at the specific current "i". Therefore, using equations (1) and (2), the voltage across the series connected traction motor 14A can be determined by equation (3):

$$V_{dc}=(R_a+R_f)i+(L_a+L_f)di/dt+(Eprpm)\omega \quad (3)$$

Figure 3:
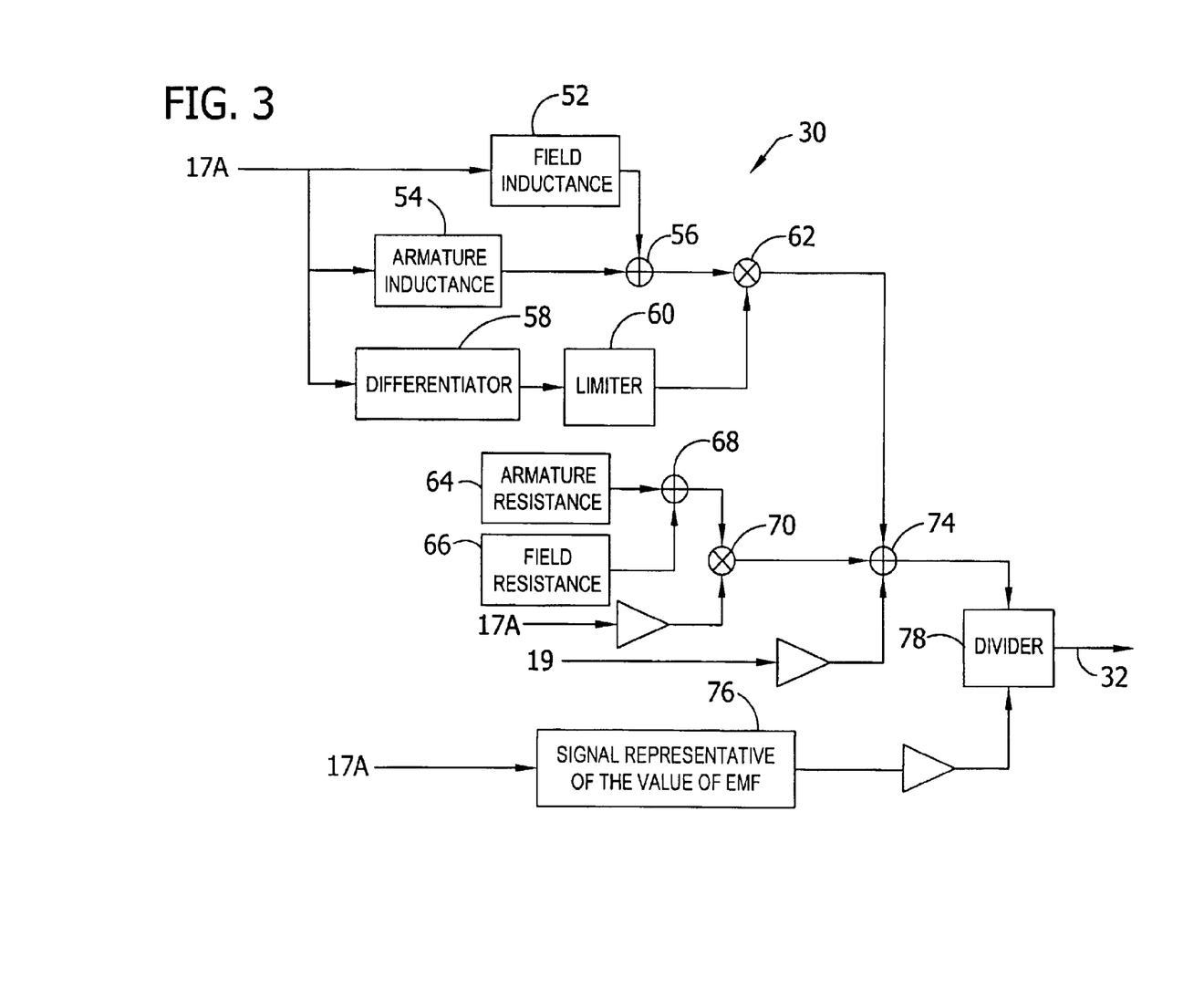
FIG. 3 is a functional block diagram of one embodiment of a motor speed estimation system incorporating aspects of the invention.

Solving equation (3) for speed in rpm given the current and the voltage across the field 44 and the armature 42, a motoring equation (4) useful for determining the speed of the motor is produced:

$$\omega=[V_{dc}-(R_a+R_f)i-(L_a+L_f)di/dt]/Eprpm \quad (4)$$

wherein:

$\omega$=Rotational speed in rpm
$V_{dc}$=Alternator voltage
$R_a$=Armature resistance
$R_f$=Field resistance
i=field and armature currents in series connected motor
$L_a$=Armature inductance
$L_f$=Field inductance
di/dt=Time rate of change of current "i"
Eprpm=Emf at specific current It will be recognized that the invention is preferably implemented in a computer such as the processor 24 of FIG. 1. However, for purpose of explanation, the implementation is shown below using functional block diagrams. FIG. 3 is a logic diagram illustrating the wheel speed estimator 30 of FIG. 1. The motor speed estimator 30 produces the estimated motor speed signal 32 using equation (4) to determine the rotational speed of the motor armature 42 in revolutions per minute for the traction motor 14A operating in the motoring mode at one exemplary axle-wheel set 22. (For sake of explanation, the illustrated example relates to traction motor 14A and axle-wheel set 22. Similar calculations can be made for traction motors 14B–F.) The current (armature and filed currents) in the series connected traction motor 14A is measured with current sensor 16A of FIG. 2 to produce a current signal 17A. Using the current signal 17A, the field inductance 52 and the armature inductance 54 are determined based on design specifications and/or test data for the DC traction motor 14A. For example, field and armature inductances are stored in a look-up table accessible by the processor 24 of FIG. 1. The field inductance 52 and the armature inductance 54 are applied to a summing junction 56. The current signal 17A is also provided to a differentiator 58 to determine the time rate of change of the current signal 17A using methods known to those skilled in the art. In one example, a sample of the present current signal and a sample of the current signal at a previous time are compared and divided by the time difference between the samples using a software algorithm. Samples are repeatedly taken, for example every 0.01 second, to determine the time rate of change of the current signal. Preferably, the output of the differentiator 58 is passed through a limiter 60 to remove readings that exceed a desired limit to negate spurious readings. In one example, the limiter 60 removes differentiator output signals exceeding 100 amp/sec. The output of the limiter 60 and the output of summing junction 56 are applied to a multiplier 62.

Values for the armature resistance 64 and the field resistance 66 are obtained from design specifications and/or test data for the traction motor 14A and applied to a summing junction 68. As resistances may vary based upon temperature, in one embodiment, a temperature compensation step is performed using methods known to those skilled in the art. The output of the summing junction 68 and the current signal 17A are applied to a multiplier 70. The voltage 19 produced by alternator 12 is measured by voltage sensor 18 of FIG. 2. Voltage 19 and the outputs of multiplier 62 and multiplier 70 are provided to a summing junction 74. The Eprpm value 76 at the measured current 17A is obtained for the traction motor 14A using the design specifications and/or test data for the motor. For example, Eprpm values are stored in a look-up table accessible by the processor 24 of FIG. 1. The output of summing junction 74 is divided by the Eprpm signal 76 in divider 78 to obtain the estimated motor speed signal 32 in revolutions per minute.

Figure 4:
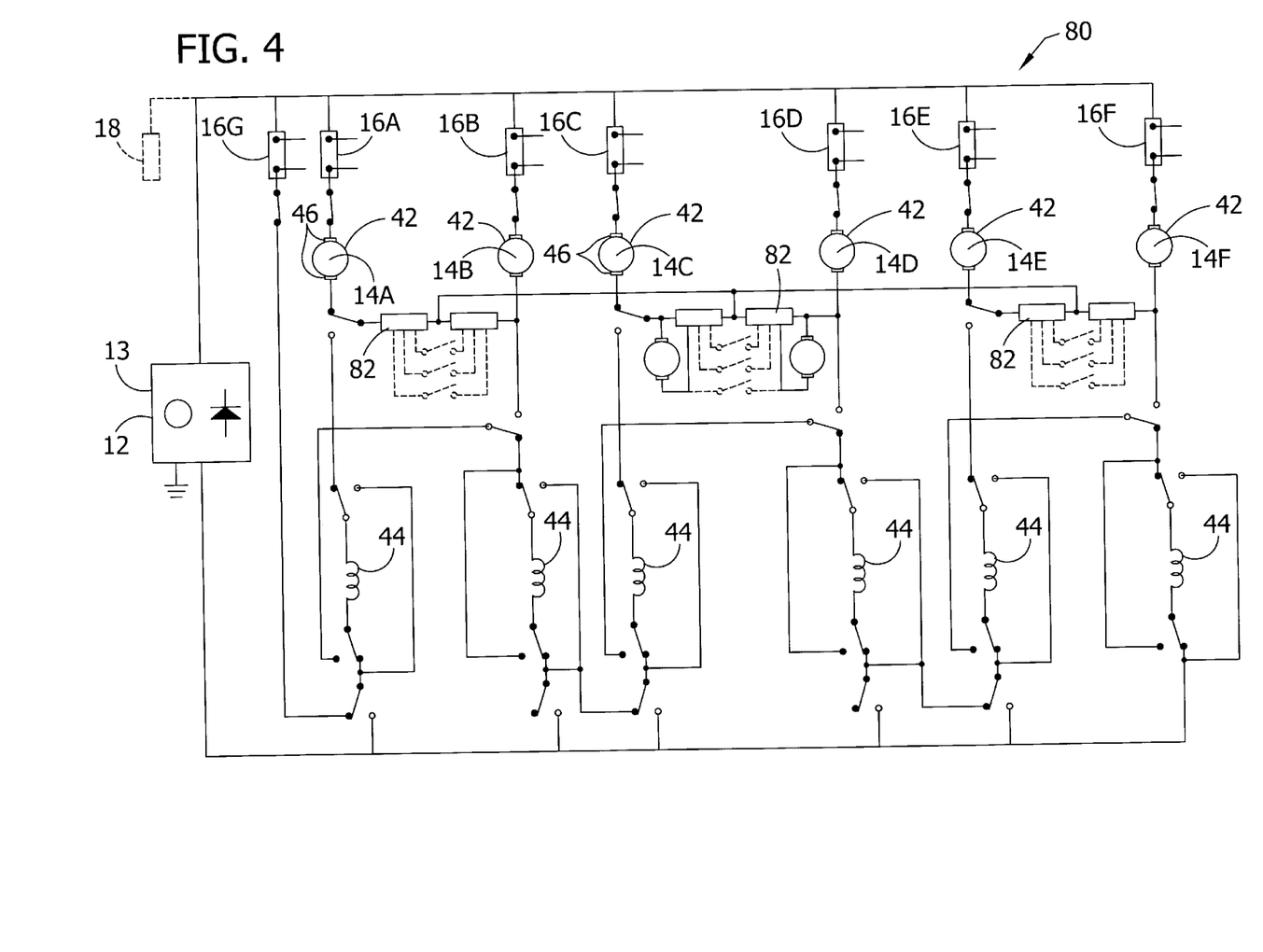
FIG. 4 is a schematic diagram showing the equivalent circuit for the locomotive system of FIG. 1 operating in a braking mode.

FIG. 4 is a simplified schematic of an equivalent circuit 80 for the DC locomotive system 10 operating in the braking mode. In the electrical braking or retarding mode of operation, inertia of the locomotive system 10 of FIG. 1 is converted into electrical energy by utilizing the traction motors 14 as generators. Preferably, a grid of resistors 82 having a resistance "$R_{grid}$" is used to dissipate the energy. In the braking mode, the field is separately excited. Therefore the Eprpm is a function of the field and armature currents since the both are instrumental in producing the flux in the machine. The total voltage drop is 0 since no external voltage is applied across the armature.

One skilled in the art can solve equation (2) above with additional grid and brush drop resistances for the equivalent circuit 80 in the braking mode to give equation (5):

$$0=(R_a+R_{grid}+R_{brush\ drop})i_a+(L_a)di_a/dt+[Eprpm(i_f,i_a)]\omega \quad (5)$$

Figure 5:
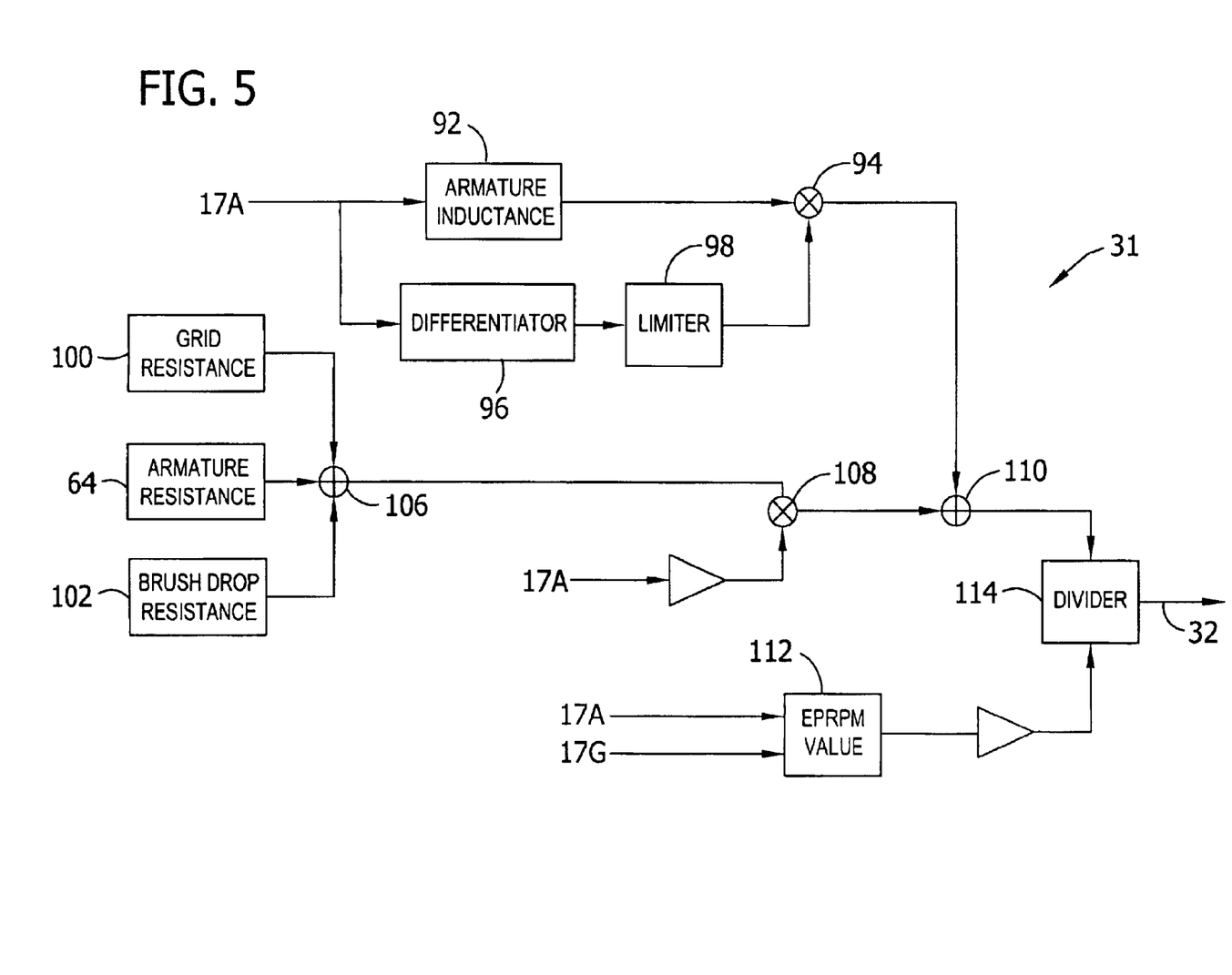
FIG. 5 is a functional block diagram of another embodiment of a motor speed estimation system incorporating aspects of the invention.

Solving equation (5) for speed in rpm given the current and the voltage across the field 44 and the armature 42, a braking equation (6) useful for determining the speed of the motor is produced:

$$\omega=[(L_a)di_a/dt-(R_a+R_{grid}+R_{brush\ drop})i_a]/Eprpm(i_f,i_a) \quad (6)$$

wherein:

$\omega$=Rotational speed in rpm
$R_a$=Armature resistance
$R_{grid}$=Grid resistance
$R_{brush\ drop}$=Brush drop resistance
$i_a$=Armature current
$i_f$=Field current
$L_a$=Armature inductance
$L_f$=Field inductance
$di_a$/dt=Time rate of change of armature current
Eprpm($i_f,i_a$)=Emf at specific armature and field currents per rpm FIG. 5 is a simplified, functional block diagram illustrating the motor speed estimator for the braking mode 31 of FIG. 1. The motor speed estimator 31 produces the estimated motor speed signal 32 using equation (6) to determine the rotational speed of the motor armature 42 in revolutions per minute for the traction motor 14A operating in the braking mode at one exemplary axle-wheel set 22. (For sake of explanation, the illustrated example relates to traction motor 14A and axle-wheel set 22. Similar calculations can be made for traction motors 14B–F). The armature current is measured with current sensor 16A of FIG. 4 to produce the current signal 17A. Using the current signal 17A, the armature inductance 92 is determined based on the design specifications and/or test data for the DC traction motor 14A as described above. The armature inductance 92 is applied to a multiplier 94. The current signal 17A is also provided to a differentiator 96 to determine the time rate of change of the current as described above. The output of the differentiator 96 is passed through a limiter 98 to remove spurious readings that exceed a desired limit. The output of the limiter 98 is also applied to multiplier 94.

The armature resistance 64, a grid resistance 100 and a brush drop resistance 102 are obtained from the design specifications and/or test data for the traction motor 14A and the resistor grid 82 of FIG. 4 and applied to a summing junction 106. As resistances vary based upon temperature, in one embodiment, a temperature compensation step is performed using methods known to those skilled in the art. The output of summing junction 106 and the current signal 17A are applied to a multiplier 108. The outputs of multiplier 94 and multiplier 108 are provided to a summing junction 110. The Eprpm value 112 at the measured current signal 17A is obtained for the traction motor 14 using the design specifications and/or test data for the motor. The output of summing junction 110 is divided by the Eprpm 112 in divider 114 to obtain the estimated motor speed signal 32 in revolutions per minute.

Figure 6:
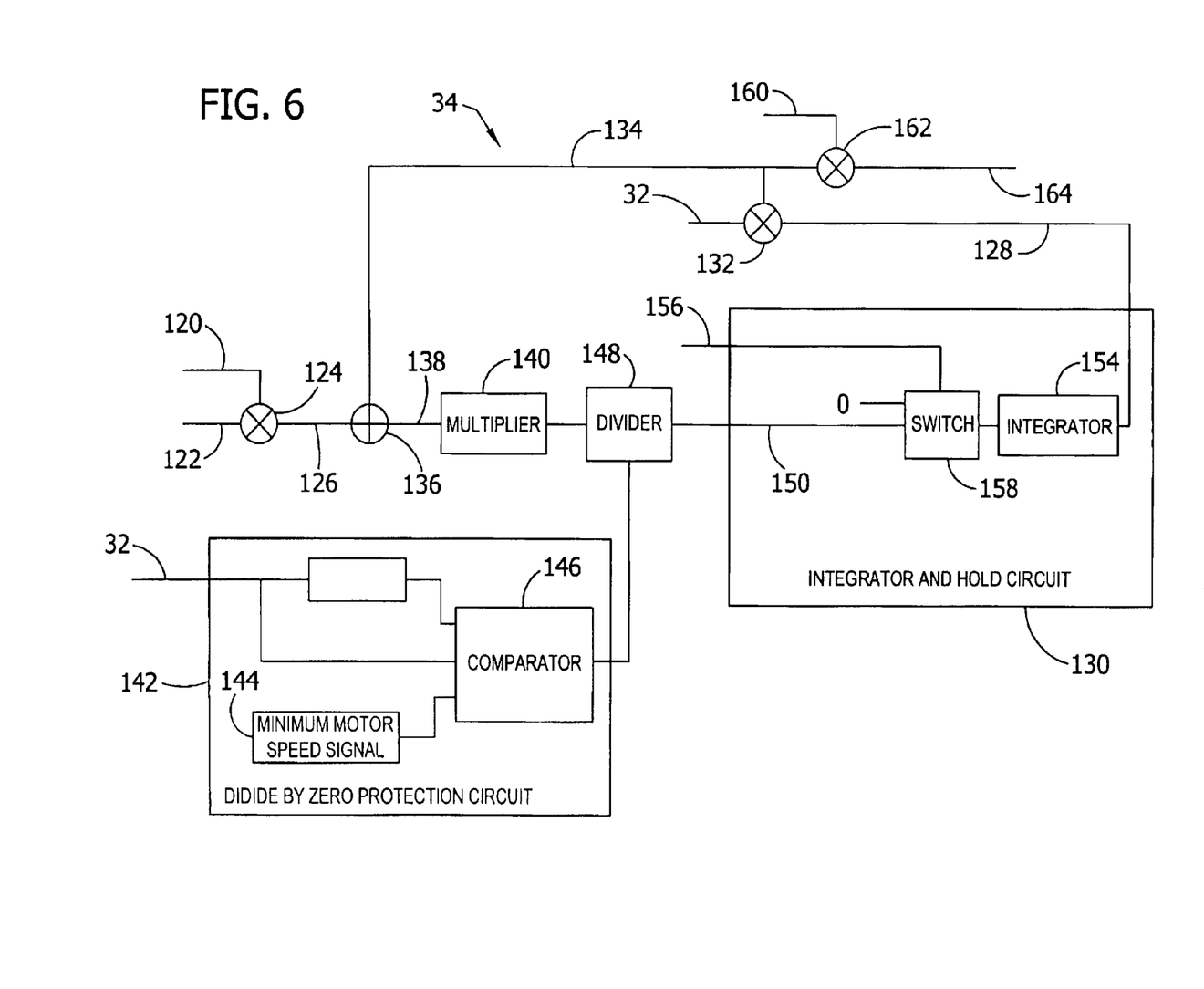
FIG. 6 is a functional block diagram of one embodiment of an adjustment block for use with the motor speed estimation systems of FIGS. 3 and 5.

FIG. 6 is a simplified, functional block diagram illustrating one embodiment of the wheel diameter adjustment block 34A. One assumption of the wheel diameter adjustment block 34A is that in non-slipping conditions (determined in the adjust enable signal described below), the linear wheel speed (in mph) of all of the axle-wheels sets 22 will be the same. The rotational wheel speeds (in rpm) are multiplied by a wheel diameter and gear ratio to get the linear wheel speed (in mph). Thus, a primary factor (but not the only one) affecting the steady state accuracy of linear wheel speeds is inaccurate wheel diameters. One purpose of the wheel diameter adjustment block 34A is to remove steady state inaccuracies in wheel speeds under non-slipping conditions due to wrong wheel diameters and/or other system inaccuracies. Wheel diameters can be measured, but due to wheel wear, the actual diameter changes over the life of the wheel.

A reference wheel speed 120 is multiplied by a reference wheel diameter 122 and applied to a multiplier 124 to produce a linear wheel speed reference 126. The reference wheel speed 120 is a selected reference signal and, for example, can be the wheel speed as calculated above with respect to FIGS. 3 or 5 for an axle-wheel set 22 that is designated as the reference axle. In one example, axle-wheel set 22 coupled to motor 14B is selected as the reference axle. However, as one skilled in the art will understand, any axle may be used as the reference axle. The reference wheel diameter 122 is also a selected reference signal and, for example, can be the wheel diameter one of the wheels on the reference axle. Alternately, the reference wheel diameter 122 can be an arbitrarily selected wheel diameter. In one embodiment, the reference wheel diameter 122 is 42.0 inches. The estimated motor speed 32 (in rpm) for the input axle (i.e., axle 22 coupled with motor 14A) is multiplied by an output 128 of an integrator and hold circuit 130, which will be described below, at multiplier 132. An output 134 of multiplier 132 is subtracted from the output 126 of multiplier 124 at a summer 136 to give an error signal 138 in linear speed between the reference wheel speed 122 and the input motor speed 32. The linear speed error 138 is caused by the difference between the reference wheel diameter 120 and an actual diameter of the input wheel (for example, a wheel on axle-wheel set 22). The difference is multiplied by a constant at multiplier 140 to give an adjusted linear speed error output 141.

In one embodiment, the estimated motor speed 32 for the input axle is applied to a divide-by-zero protection circuit 142. A comparator 146 compares the motor speed 32 to a minimum wheel speed 144, for example, 10 rpm. If the motor speed 32 is greater than the minimum wheel speed 144, the motor speed 32 is passed through the divide-by-zero protection circuit 142. If the motor speed 32 is less than the minimum wheel speed 144, the minimum wheel speed 144 is passed through the comparator 146. The output 141 is divided by the output of the divide-by-zero protection circuit 142 at divider 148. One reason the adjusted linear speed error output 141 is divided by the input motor speed 32 is so that the loop gain does not vary with wheel speed and perhaps become unstable. As the wheel speed increases, it can be seen that the linear speed error 141 will also increase. Dividing the linear speed error 141 by the motor speed 32 allows for an error signal that is substantially independent of motor speed 32.

A linear speed error 150 from the output of divider 148 is applied to the integrator and hold circuit 130. The output 128 of the integrator and hold circuit 130 is the diameter of the input wheel (i.e., wheel on axle-wheel set 22 coupled to motor 14A) with respect to the reference wheel diameter 120. In one embodiment, the integrator and hold circuit 130 uses an integrator 154 and a switch 158. The switch 158 passes the speed error 150 through when an adjust enable switch 156 is set to TRUE. The switch 158 sets its output to zero when the adjust enable signal 156 is FALSE. The adjust enable signal 156 is set to TRUE during substantially non-slipping conditions, such as during steady state speed operation. During conditions where slipping is expected, the adjust enable 156 is set to FALSE (i.e., 0). In one embodiment, the integrator 154 is implemented by an Euler approximation. Alternatively, the integrator 154 may be implemented by trapezoidal approximation or other methods known to those skilled in the art may be used. The output 128 of the integrator 154 is the diameter of the calibration wheel. The integrator 154 contained in the hold circuit 130 is configured to make the steady state value of the linear speed error 150 zero when the adjust enable signal 156 is set to TRUE (i.e., 1).

The diameter of the calibration wheel 128 is multiplied by the input motor speed 32 to obtain the corrected linear speed 134. The corrected linear speed 134 is applied to the summer 136 as described above. The corrected linear speed 134 and a gear ratio signal 160 are applied to a multiplier 162 to obtain a corrected linear wheel speed 164 in units such as miles per hour or kilometers per hour.

Figure 7:
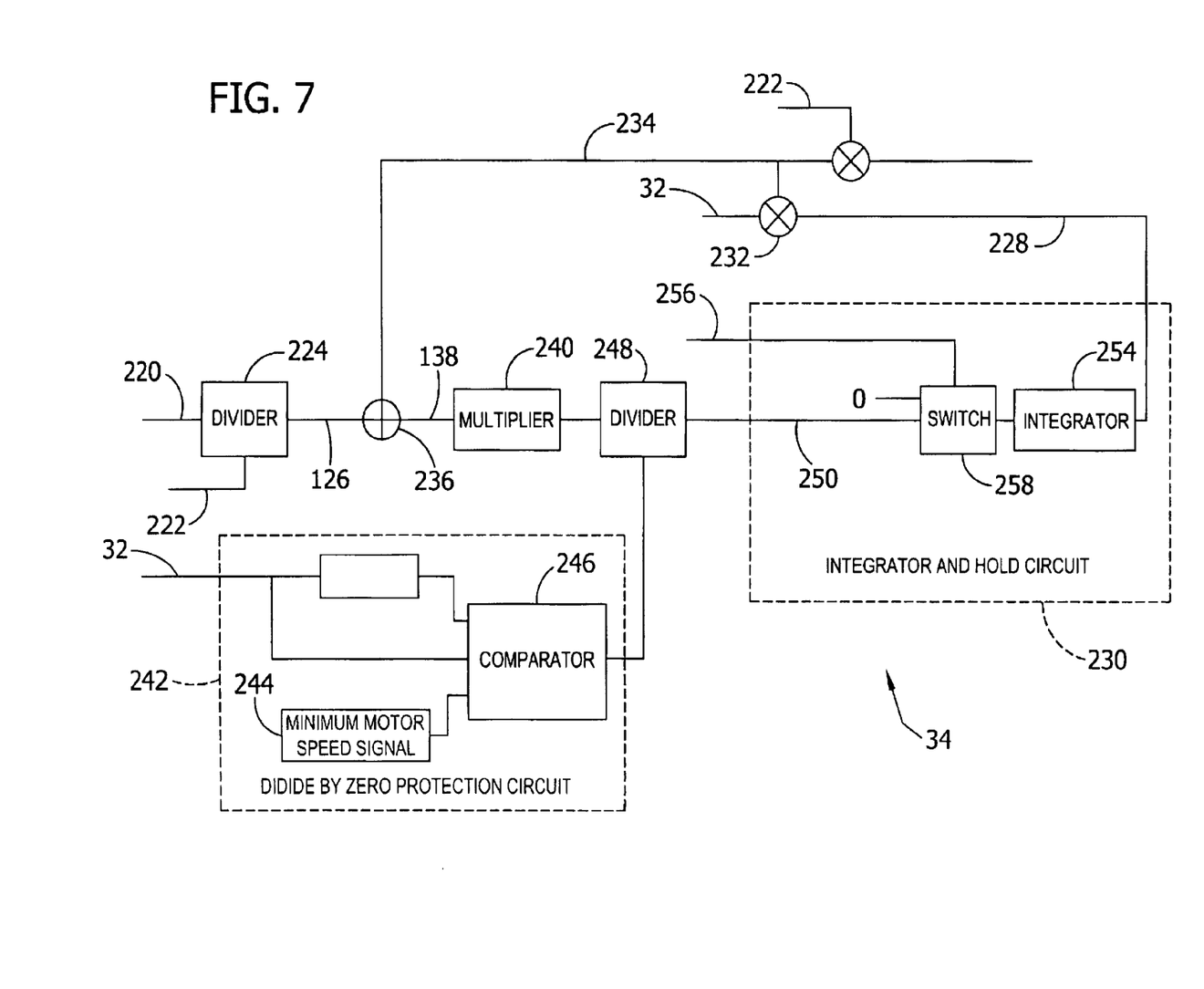
FIG. 7 is a functional block diagram of another embodiment of an adjustment block for use with the motor speed estimation systems of FIGS. 3 and 5

FIG. 7 is a simplified, functional block diagram illustrating another embodiment having a GPS adjustment block 34B. In some situations, the locomotive system 10 (FIG. 1) is provided with an auxiliary linear ground speed sensor such as a satellite sensor such as a GPS unit or a radar unit. For example, when the locomotive system 10 is provided with a GPS sensor, the GPS speed signal 26 corresponding to the linear speed of the locomotive is provided to the processor 24 of FIG. 1. The GPS speed signal 26 is used as a correction signal in the adjustment block 34B. One purpose of the GPS adjustment block 34B is to remove steady state inaccuracies in wheel speeds under non-slipping conditions due to inaccurate wheel diameters and/or other system inaccuracies when an independent speed signal, such as a GPS derived speed, is available. The adjustment block 34B computes a steady state correction signal as will be described below, to give an estimate of wheel speed in mph or other desired units.

The GPS speed signal 26 is divided by a gear ratio 222 at divider 224 to produce a reference rotational speed 226. The GPS speed signal 26 is the linear speed of the locomotive system 10 of FIG. 1 determined by a conventional GPS receiver as is known in the art or some other linear downspeed sensor. Alternately, the linear speed of the locomotive system 10 can be determined by any other independent method of determining linear speed. The gear ratio 222 is the ratio of traction motor armature turns to linear movement of locomotive system 10. The gear ratio 222 can be determined through periodical calibration tests or mathematically using physical properties of the locomotive. The motor speed signal 32 (in rpm) for the input traction motor (i.e., motor 14A) is multiplied by an output 228 of an integrator and hold circuit 230, which will be described below, at multiplier 232. An output 234 of the multiplier 232, corresponding to a corrected rotational speed, is subtracted from the reference rotational speed 226 at a summer 236. The output of summer 236 is a rotational speed error signal 238 caused by the difference in the reference rotational speed 226 and the corrected rotational speed 234. The difference is multiplied by a constant at multiplier 240 to give an adjusted rotational speed error signal 241.

In one embodiment, the motor speed signal 32 for the input axle is applied to a divide-by-zero protection circuit 242. A comparator 246 compares the motor speed signal 32 to a minimum motor speed signal 244, for example, 10 rpm. If the motor speed signal 32 is greater than the minimum motor speed signal 244, the motor speed signal 32 is passed through the protection circuit 242. If the motor speed signal 32 is less than the minimum motor speed signal 244, the minimum motor speed signal 244 is passed through the comparator 246 to provide divide by zero protection. The adjusted rotational speed error signal 241 is divided by the output of the divide-by-zero protection circuit 242 at divider 248. One reason the adjusted rotational speed error signal 241 is divided by the motor speed signal 32 is so that the loop gain does not vary with motor speed and perhaps become unstable at high or low speeds. As the motor speed increases, it can be seen that the adjusted rotational speed error signal 241 will also increase. Dividing the adjusted rotational speed error signal 241 by the motor speed signal 32 allows for an error signal that is substantially independent of motor speed.

A scaled rotational speed error 250 from the output of divider 248 is applied to the integrator and hold circuit 230. In one embodiment, the integrator and hold circuit 230 uses an integrator 254 and a switch 258. The switch 258 passes the speed error 250 through when an adjust enable switch 256 is set to TRUE. The switch 258 sets its output to zero when the adjust enable signal 256 is FALSE. The adjust enable signal 256 is set to TRUE during substantially non-slipping conditions, such as during steady state speed operation. During conditions where slipping is expected, the adjust enable 256 is set to FALSE (i.e., 0). In one embodiment, the integrator 254 is implemented by an Euler approximation. Alternatively, the integrator 254 may be implemented by trapezoidal approximation or other methods known to those skilled in the art may be used. The output 228 of the integrator 254 is the diameter of the calibration wheel. The integrator contained in the integrator and hold circuit 230 is configured to make the steady state value of the rotational speed error 250 zero when an adjust enable signal 256 is set to TRUE (i.e., 1).

The output 228 is multiplied by the input motor speed 32 to obtain the corrected rotational speed 234. The corrected rotational speed 234 is applied to the summer 236 as described above. The corrected rotational speed 234 and the gear ratio signal 222 are also applied to a multiplier 262 to obtain a corrected linear wheel speed 264 in units such as miles per hour or kilometers per hour.

Figure 8:
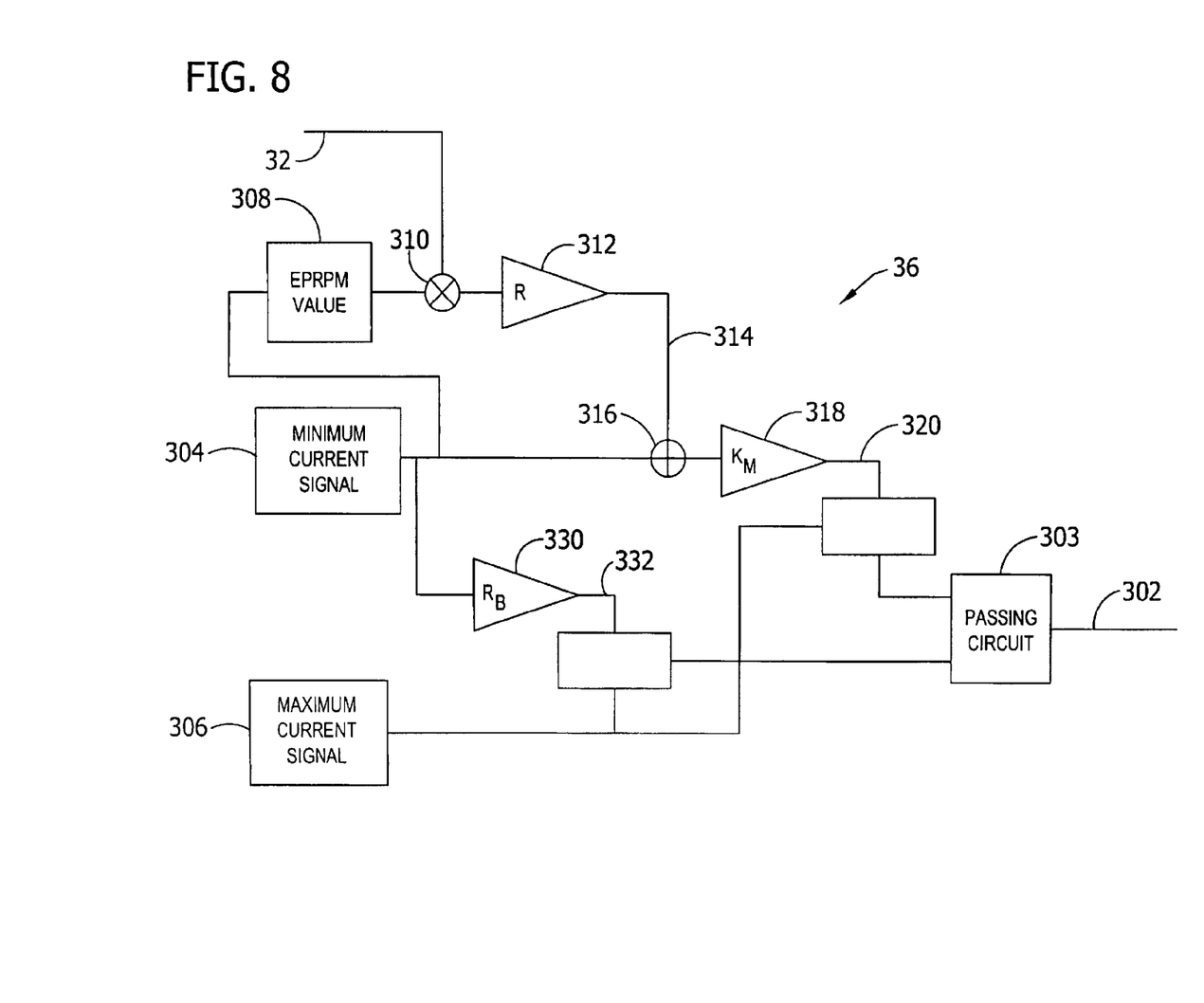
FIG. 8 is a functional block diagram of one embodiment of a locked axle detection block for use with the motor speed estimation systems of FIGS. 3 and 5.

The estimated motor speed signal 32 is also used in the locked axle detect block 36 to determine if a locked axle condition is present. If a locked axle condition occurs on a given axle while the locomotive 10 is moving, the rotational speed of that axle decreases to zero, and all the other axles rotate at a speed corresponding to the speed of the locomotive. The locked axle detect block 36 receives the motoring mode signal 28 and the braking mode signal 29 to determine whether the locomotive system 10 of FIG. 1 is operating in the motoring or braking mode. During motoring operations, equation (7) is used to determine if a locked axle condition exists, and equation (8) is used during braking operations.

$$i_{max} > K_M * (i_{min} + [Eprpm * \omega]/R_a) \tag{7}$$

wherein:

$i_{max}$=maximum traction motor armature current
$i_{min}$=Minimum traction motor armature current
$K_M$=System constant for motoring mode
Eprpm=Emf at specific traction motor armature and field currents
$\omega$=Rotational speed in rpm of specific traction motor
R=Armature and field resistance $$i_{max} > K_B * i_{min} \tag{8}$$

wherein:

$i_{max}$=maximum traction motor armature current
$i_{mim}$=Minimum traction motor armature current
$K_B$=System constant for braking mode FIG. 8 is a logic diagram illustrating the locked axle detection block 36 of FIG. 1. The locked axel detection block 36 produces the locked axle signal 302 using equations (7) and (8) to determine the motor armature current signal 17A–F for any one of the traction motors 14 meet criteria as set forth below. The locked axle signal 302 is generated by a passing circuit 303. Circuit 303 receives the motoring mode signal 28 and the braking mode signal 29 to determine the present mode of operation of the locomotive system 10.

The current signals 17A–F are measured as described above and a minimum current signal 304 and a maximum current signal 306 are determined from the current signals 17A–F using methods known to those skilled in the art. The Eprpm value 308 at the current indicated by the minimum current signal 304 is obtained for the specific traction motor 14 using the design specifications and/or test data for the motor. The motor speed signal 32 for the motor with the minimum current signal 304 is multiplied by the Eprpm value 308 at multiplier 310 to give Emf. The output of multiplier 310 is divided by an armature and field resistance 312 for the traction motor to produce an output 314. The armature and field resistance 312 is obtained from design specifications and/or test data for the traction motor 14. As resistances varies based upon temperature, in one embodiment, a temperature compensation step is performed using methods known to those skilled in the art. Output 314 is added to the minimum current signal 304 at summing junction 316. The output of summing junction 316 is multiplied by a constant $K^M$ 318 to produce current signal 320. The value of $K_M$ is determined empirically for each traction motor 14 operating in the motoring mode. The value of $K_M$ preferably is between 1 and 5, and in one embodiment is 1.5. Current signal 320 is compared to the maximum current signal 306. If signal 320 is greater than 306, and the passing circuit 303 determines that the locomotive system 10 is operating in the motoring mode, the locked axle signal 302 is generated.

The minimum current signal is also multiplied by a braking constant $K_B$ 330 to produce a current signal 332. The value of $K_B$ 330 is determined empirically for each traction motor 14 for the braking mode. The value of $K_B$ preferably is between 1 and 5, and in one embodiment is equal to 2. Current signal 332 is compared to the maximum current signal 306. If the signal 332 is greater than signal 306, and the passing circuit 303 determines that the locomotive system 10 is operating in the braking mode, the locked axle signal 302 is generated.

To confirm that a locked axle condition actually exists, while maintaining locomotive speed, the voltage is removed from the traction motor 14 associated with the locked axle signal 302 for a determined length of time while maintaining voltage on the remaining traction motors. A locomotive system operator can then verify the presence of an actual locked axle if the locked axle detection block 36 does not generate a locked axle signal 302 for another axle. The locked axle is confirmed by reapplying voltage to the traction motor associated with locked axle and confirming that the locked axle detection block 36 again generates a locked axle signal 302.

This invention solves the longstanding problem of estimating the speeds of a vehicle's wheels that are driven by dc motors when mechanical speed sensors are not available. The wheel speeds are estimated in both motoring and in dynamic braking modes of operation. The rotational speeds are corrected by the wheel diameters to give translation speeds and a wheel diameter adjustment corrects for uneven wheel diameters. Given an independent low frequency speed measurement (ex. GPS), a low frequency adjust is included that corrects for low frequency offsets. A detection algorithm uses the wheel speeds to detect a locked axle condition.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of estimating the speed of a vehicle propelled by a DC traction motor having an armature coil and a field coil and being mechanically coupled to at least one wheel on the vehicle so as to rotate said wheel and propel the vehicle, said method including monitoring electrical operating parameters of the DC traction motor without use of a speed sensor, said method comprising:
   measuring the current in the armature coil and the current in the field coil of the DC traction motor;
   measuring a voltage applied to the DC traction motor; and
   determining a rotational speed of the DC traction motor as a function of the measured currents and voltage.

2. The method of estimating speed according to claim 1 further including applying a correction factor to the determined rotational speed to obtain a corrected rotational speed.

3. The method of estimating speed according to claim 2 further including converting the corrected rotational speed into a linear speed.

4. The method of estimating speed according to claim 1 wherein determining a rotational speed comprises determining the rotational speed as a function of an electrical current in an armature of the DC traction motors.

5. The method of estimating speed according to claim 1 wherein determining a rotational speed further comprises determining the rotational speed as a function of whether the vehicle is operating in a motoring mode of operation or a braking mode of operation.

6. The method of estimating speed according to claim 5 wherein the step of determining a rotational speed is performed by a motoring speed estimator when the vehicle is operating in a motoring mode and is performed by a braking speed estimator when the vehicle is operating in a braking mode.

7. The method of estimating speed according to claim 1 wherein the vehicle is a locomotive.

8. The method of estimating speed according to claim 1 wherein the currents are measured with a current sensor sensing a current applied to the armature and the voltage is measured with a voltage sensor sensing a voltage applied to the armature.

9. The method of estimating speed according to claim 1 wherein the act of applying a correction factor comprises comparing the rotational speed with a reference rotational speed.

10. The method of estimating speed according to claim 9 wherein the vehicle comprises a second DC traction motor coupled to a wheel of the vehicle and the reference rotational speed is the rotational speed of said second motor.

11. The method of estimating speed according to claim 1 wherein the correction factor is calculated with an integration process using an Euler approximation.

12. The method of estimating speed according to claim 1 wherein the correction factor corrects for variations in a wheel diameter.

13. The method of estimating speed according to claim 1 wherein the act of applying a correction factor includes receiving GPS data and using the GPS data to obtain a rotational speed error.

14. A system for estimating the speed of a vehicle propelled by a DC traction motor having an armature coil and a field coil and being mechanically coupled to at least one wheel on the vehicle so as to rotate said one or more wheel and propel the vehicle, said method including monitoring electrical operating parameters of the traction motor without use of a speed sensor, said system comprising:
   at least one electric current detector configured to measure current in an armature coil of the DC traction motor and produce a signal indicative of said currents;
   at least one electric current detector configured to measure current in a field coil in the DC traction motor and produce a signal indicative of said current;
   a voltage detector configured to measure voltage applied to the DC traction motor and produce a signal proportional to said voltage; and
   a processor receiving signals indicative of said current and voltage for determining a rotational speed of the motor as a function of the motor currents and voltages.

15. A system for estimating the wheel speed of a vehicle propelled by the DC traction motors in accordance with claim 14, wherein the processor is configured to receive said current and voltage signals, the processor comprising:
   a motoring speed estimator module configured to determine a motor rotational speed using the current and voltage signals when the vehicle is operating in a motoring mode.

16. A system for estimating the speed of a vehicle propelled by the DC traction motor in accordance with claim 15, wherein said processor further comprises a locked axle detection module.

17. A system for estimating the speed of a vehicle propelled by the DC traction motors in accordance with claim 16 wherein the speed correction module is configured to use an integration process using an Euler approximation.

18. A system for estimating the speed of a vehicle propelled by the DC traction motors in accordance with claim 14 wherein the vehicle is a locomotive.

19. A method of detecting the occurrence of a locked axle condition in a vehicle propelled by multiple DC traction motors each having an armature coil and a field coil by monitoring electrical operating parameters of the traction motor, without use of a speed sensor, said method comprising:

measuring current in the armature coil for each of a plurality of DC traction motors connected to a plurality of axles;

determining a minimum armature current from the measured currents;

determining a maximum armature current from the measured currents; and comparing the minimum armature current to the maximum armature current to identify the occurrence of a locked axle condition.

20. A method of detecting the occurrence of a locked axle condition in a vehicle propelled by multiple DC traction motors in accordance with claim 20 further comprising determining if the locomotive is operating in a motoring mode or a braking mode, and adding a value to the minimum armature current proportional to an Emf value for the traction motor multiplied by the rotational speed of the traction motor and divided by a resistance value for the traction motor when the vehicle is operating in the motoring mode.

21. A method of detecting the occurrence of a locked axle condition in a vehicle propelled by multiple DC traction motors in accordance with claim 19 further comprising estimating the rotational speed of the traction motor by measuring the current in the armature coil and in the field coil of one of said DC traction motors, said DC traction motor being mechanically coupled to at least one wheel on the vehicle so as to rotate said one or more wheel, measuring a voltage applied to the DC traction motor, and determining a rotational speed from the measured currents and voltage.

22. A method of detecting the occurrence of a locked axle condition in a vehicle propelled by multiple DC traction motors in accordance with claim 19 further comprising verifying the occurrence of the locked axle condition by removing the voltage applied to the motor associated with the locked axle condition while maintaining voltage on the remaining motors and verifying that there is not an occurrence of a locked axle condition for any other axle.

23. A system for estimating the speed of a vehicle as set forth in claim 14 further comprising a processor configured to apply a correction factor to the determined rotational speed to obtain a corrected rotational speed.

24. A system for estimating the speed of a vehicle as set forth in claim 14 further comprising a braking speed estimator module configured to determine a motor rotational speed using the current and voltage signals when the vehicle is operating in a braking mode.

25. A system for estimating the speed of a vehicle as set forth in claim 15 further comprising a speed correction module configured to receive said signal indicative of the motoring mode motor rotational spped and at least one reference signal, said speed correction module configured to apply a correction factor to said rotational speed signal and translate said rotational speed signal to a linear speed signal.

26. A system for estimating the speed of a vehicle as set forth in claim 24 further comprising a speed correction module configured to receive said signal indicative of the braking mode motor rotational speed and at least one reference signal, said speed correction module configured to apply a correction factor to said rotational speed signal and translate said rotational speed signal to a linear speed signal.

* * * * *

UNITED STATES PATENT AND TRADEMARK OFFICE
CERTIFICATE OF CORRECTION

PATENT NO. : 6,813,583 B2
DATED : November 2, 2004
INVENTOR(S) : Ajith Kuttannair Kumar It is certified that error appears in the above-identified patent and that said Letters Patent is hereby corrected as shown below:

Column 14,
Line 26, "spped" should read -- speed --.

Signed and Sealed this

Twenty-sixth Day of April, 2005

JON W. DUDAS
*Director of the United States Patent and Trademark Office*